Figure 1:
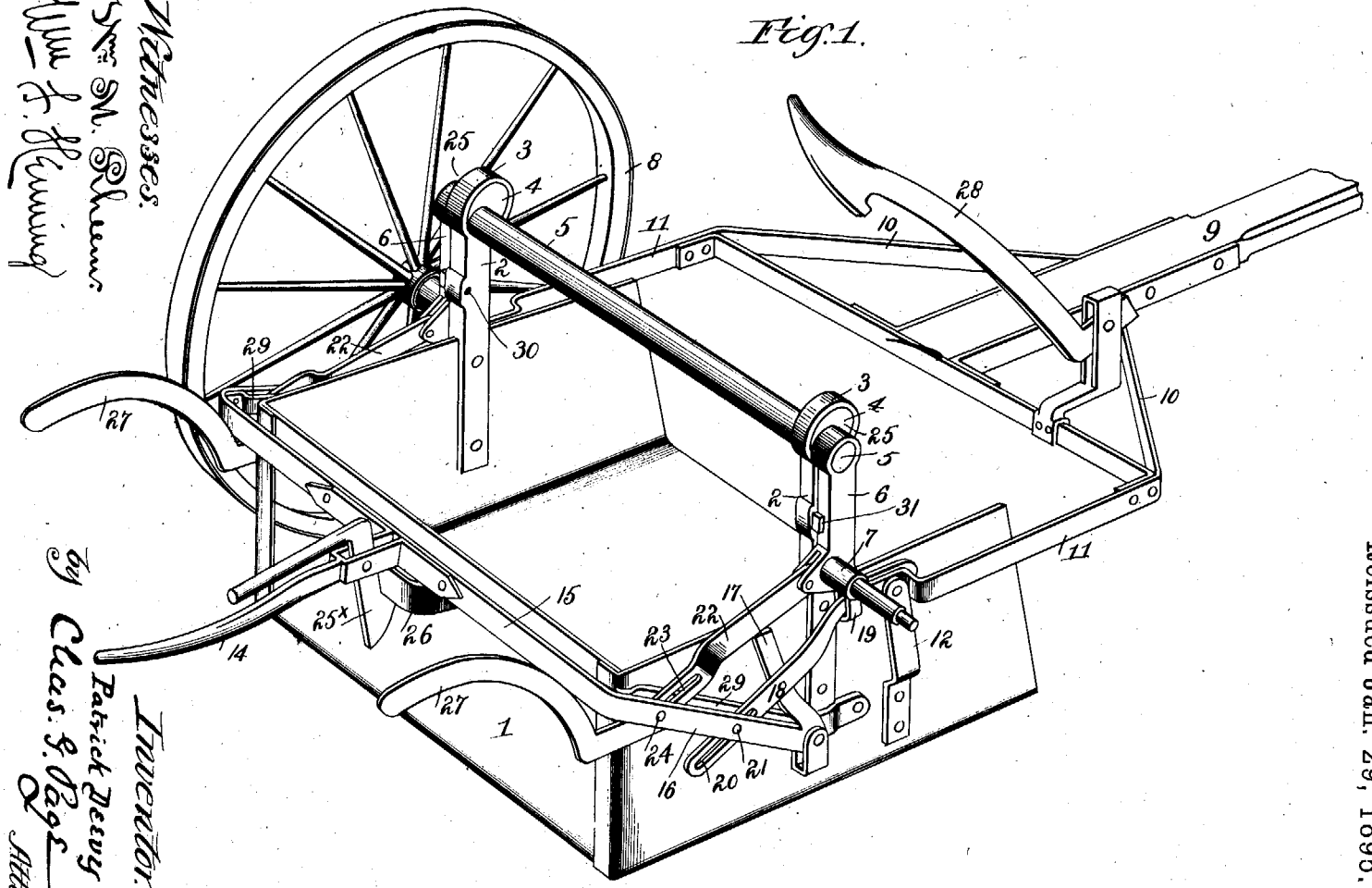

2 Sheets—Sheet 1.

P. DEEVY.

WHEELED SCRAPER.

No. 11,468. Reissued Jan. 29, 1895.

Witnesses.
Wm. M. Rheem.
Wm. F. Henning

Inventor.
Patrick Deevy
by Chas. G. Page
Attys.

2 Sheets—Sheet 2.

P. DEEVY.

WHEELED SCRAPER.

No. 11,468. Reissued Jan. 29, 1895.

Witnesses.
Wm. M. Rheem.
Wm. F. Henning

Inventor.
Patrick Deevy
by Chas. G. Page
Atty.

UNITED STATES PATENT OFFICE.

PATRICK DEEVY, OF HANSEN, NEBRASKA, ASSIGNOR, BY DIRECT AND MESNE ASSIGNMENTS, TO THE F. C. AUSTIN MANUFACTURING COMPANY, OF CHICAGO, ILLINOIS.

WHEELED SCRAPER.

SPECIFICATION forming part of Reissued Letters Patent No. 11,468, dated January 29, 1895.

Original No. 506,212, dated October 10, 1893. Application for reissue filed February 23, 1894. Serial No. 501,316.

*To all whom it may concern:*

Be it known that I, PATRICK DEEVY, a citizen of the United States, residing at Hansen, in the county of Adams and State of Nebraska, have invented a new and useful Wheeled Scraper, of which the following is a specification.

My invention relates to wheeled scrapers and consists in certain improvements upon the devices set forth in Letters Patent No. 346,147, granted to me July 27, 1886, and Letters Patent No. 380,314, granted to me April 3, 1888.

The object of my present invention is to provide a device of the class named with means whereby the shovel or scoop may be elevated or broken out of the ground with facility and with a minimum expenditure of power.

A further object of my invention is to provide means whereby the shovel or scoop is automatically locked and held from dumping or discharging, when dropped to its operative position.

Further objects and advantages of my invention will appear in the following description, and the novel features thereof will be particularly pointed out in the appended claims.

In a wheeled scraper characterized by my invention, the scoop is suspended from the high middle portion of a cranked axle. The ends or spindle portions of said axle are journaled in the supporting traction wheels, whereby the axle can be operated so as to cause its middle portion to swing about an axis extending axially through its end spindle portions. By such arrangement, the swing of the high portion of the axle serves to raise or lower the scoop, according to the direction in which said portion of the axle is swung. The arms or bars of the draft-attachment, and the lever-arms of a yoke or bail employed for operating the cranked-axle, are pivotally attached to the sides of the scoop, the points of pivotal connection between the lever-arms and the scoop being in rear of the points of pivotal connection between the draft device or attachment and the scoop. Each lever-arm is connected with the axle by power transmitting link-connections arranged to act successively when said arm is operated for the purpose of raising the scoop from a working to a carrying position. When for example the scoop has become suitably filled with earth, and it is desired to raise the same to a carrying position, the attendant in charge will swing the yoke rearwardly. At the commencement of such operation, the yoke or lever-arms will first exert a back-pull upon the links nearest the fulcra or pivots for said arms, and hence the greatest leverage can thus be secured at a time when the greatest power is needed in "breaking ground," that is to say—lifting the scoop out of the ground which it has penetrated during operation. After thus breaking ground, the links which are more remote from the fulcra or pivots for the lever arms are brought into active use as a means for continuing the operation of the axle until the scoop has been suitably raised. By such arrangement, the several links can be connected with the axle and lever-arms in a way to secure a proper extent of motion on the part of the latter for the purpose of suitably raising the scoop, and at the same time, the links can be arranged relatively to the required leverage so as to insure ease of operation, it being observed that by providing a couple of links for each lever-arm, the two links of each pair can connect with the axle respectively at opposite sides of an axis extending through its end spindle-portions.

As a means for locking down the scoop so as to hold it in working position, the bars or arms of the draft-attachment extend back of the points whereat they are pivoted to the scoop. The scoop is also provided with movable locking devices which are controlled by the lever-arms, and hence controlled by a lever comprising a yoke which serves to provide such lever-arms. These locking devices are arranged for engaging the rear extensions of the draft-arms when the scoop is in a lowered position, and when thus engaging, the draft-arm extensions, said locking devices constitute abutments which prevent tilt on the part of the scoop in a direction for dumping or discharging.

Figure 2:
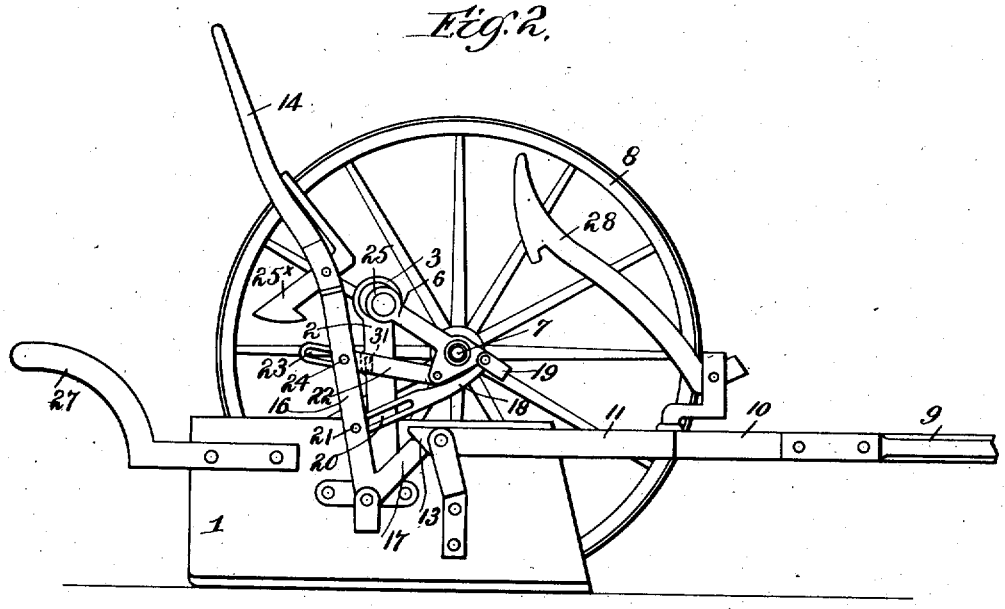
Figure 3:
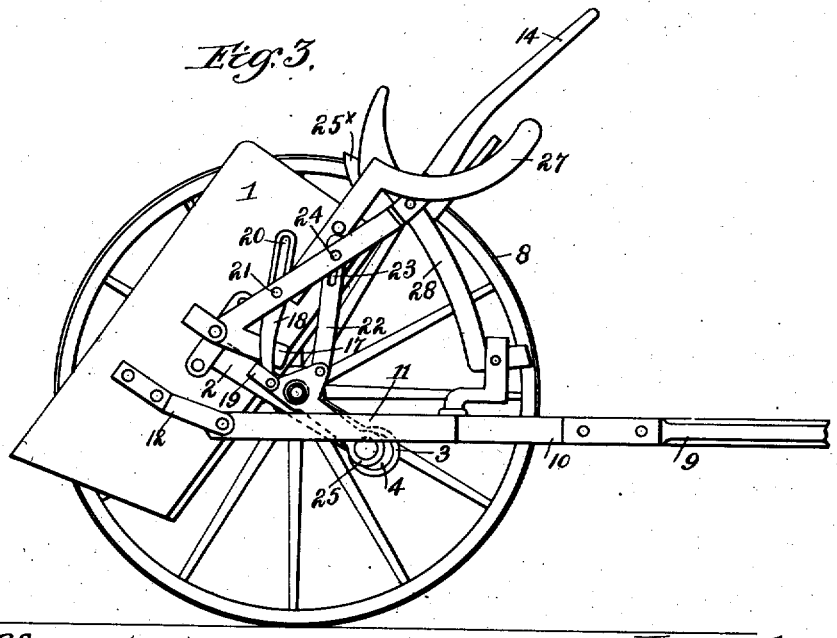

In the accompanying drawings:—Figure 1 is a perspective view of a scraper embodying my improvements. Fig. 2 is a side view of the same in its depressed or operative position. Fig. 3 is a similar view with the shovel or scoop shown in the position which it assumes after the load has been discharged and while the machine is being transported from place to place.

Similar numerals refer to corresponding parts in all the figures.

1 designates the shovel or scoop, rigidly fixed to whose sides, and rising perpendicularly therefrom, are the hangers 2 provided at their upper ends with eyes or bearings 3.

4 represents a cranked-axle, the cross-bar 5 of which is mounted in said eyes or bearings 3. This cross-bar is provided with terminal crank-arms 6 which are located outside the hangers 2 and have lateral spindles 7 upon which are mounted the traction-wheels 8.

The tongue 9 is provided with a draft-iron 10 whose parallel arms 11 are pivotally connected, by means of clips 12, to the sides of the shovel or scoop in front of hangers 2, and which are extended rearwardly from said pivotal points to form the beveled heads or extensions 13.

The operating-lever 14 is provided with a yoke 15, the arms 16 of which are pivotally connected at their terminals to the sides of the shovel or scoop at points adjacent to the hangers 2. The arms 16 are also provided with terminal extensions which form locking-arms 17, these locking arms being disposed at an acute angle to the plane of the yoke 15. Each arm 16 of the yoke is connected to the adjacent crank-arm of the axle by means of duplicate links. The lower link 18 is pivotally connected at its front end to the terminal of said crank-arm, such terminal 19, being beyond the spindle 7, and is provided at its rear end with a longitudinal slot 20, which engages a pin 21, carried by the arm 16 adjacent to its pivotal point. The link 22 is pivotally connected at its front end to the crank-arm opposite or adjacent to the spindle 7 and is also provided in its rear end with a longitudinal slot 23 which engages a pin 24, which is arranged at a greater distance from the pivotal point of the arm 16 than the pin 21. It will be noted that the lower link 18, which is connected at one end near to the pivotal point of the operating-lever and at its other end to the free end of the crank-arm, being as remote from the pivotal point or fulcrum of said crank-arm as possible, is the first to form a means of communicating the motion of the operating-lever to the crank-arm, as will be understood by reference to Fig. 2 of the drawings. The leverage afforded by this connection is preferably made as great as possible in order to facilitate the starting of the shovel in its upward movement, or breaking the same from the ground. When the shovel has been elevated to the extent possible by means of this link 18, (the movement capable of being accomplished thereby being necessarily limited, owing to its location and manner of connection) the other link 22, is brought into play and the elevation of the shovel is continued. Thus it will be seen that these duplicate levers are brought successively into operation, to respectively start and continue the elevation of the shovel, and while the above described manner of connecting these parts is preferred, it is obvious that various equivalent means and methods may be adopted without departing from the spirit of my improvement.

The lower link 18 may, for convenience, be termed a terminal link or connection, inasmuch as it serves to connect the terminal of the crank-arm to the operating lever near to its pivotal point, and the link 22 may be termed an intermediate for the reason that it connects intermediate points of the operating-lever and crank-arm. In carrying out this part of my improvement it is essential, merely, to have a plurality of links or connections which are arranged to operate successively and which are arranged to connect the members, which are the operating-lever and the crank-arm, at varying distances from their fulcrums or pivotal points, in order to distribute the strain and provide the greater leverage when the movement is initiated, for the purposes above explained.

In addition to the above described means for elevating the shovel or scoop, I employ eccentrics 25, fixed to the cross-bar of the axle and fitting in the eyes or bearings at the upper ends of the hangers 2. These eccentrics elevate the shovel the distance of their eccentricity, and because of operating gradually they produce the additional elevation without adding perceptibly to the power required to raise the shovel the distance which can be accomplished without the use of eccentrics. While not indispensable under certain circumstances, I have found the additional elevation attainable by means of the eccentrics of advantage, in practice, and therefore I prefer to construct my improved machine as described; namely, provided with this feature. The operating-lever is provided with a pivoted latch $25^{\times}$ to engage the keeper 26 upon the rear end of the shovel or scoop, when the latter is in its elevated or loaded position.

The shovel or scoop is provided with rearwardly-extending handles 27.

To hold the shovel in its dumped or transporting position I provide the ordinary retaining hook or arm 28 to engage the yoke of the operating lever, as shown in Fig. 3.

Fig. 1 of the drawings shows the parts of my improved scraper in their elevated or loaded positions, and when it is desired to drop the shovel to its operative position, as shown in Fig. 2 the latch $25^{\times}$ is disengaged from the keeper 26. As the shovel descends by gravity the free end of the operating lever ascends until it reaches an approximately vertical position, at which point the free ends of the locking-arms 17 engage the heads or beveled extensions 13 and thus lock the shovel rigidly to the draft-iron and prevent the former from tipping and discharging its contents prematurely.

With further reference to Fig. 2 it will be seen that the locking arm 17 is in effect pivotally supported upon the scoop, and that when thus in engagement with the rear extension of the draft arm or bar, it lies directly between its pivot and such extension, in which condition it serves as a locking abutment which will effectually prevent undue tilt on the part of the scoop.

When it is desired to elevate the load to convey it to the place for dumping, the free end of the operating-lever is depressed, thereby acting successively through the links 18 and 22 and communicating motion to the crank-arms of the axle, until, when the shovel reaches the point of extreme elevation the latch 25× engages the keeper 26. When the parts are in this elevated or loaded position the spindles are about opposite the hangers 2, thus bringing the centers of the traction-wheels about opposite the center of the shovel, whereby the latter is approximately balanced, a slight preponderance of weight being in the rear end.

When it is desired to discharge the contents of the shovel its rear end is elevated by means of the handles 27 until the yoke of the operating-lever is engaged by the retaining hook or arm 28.

The arms of the yoke are preferably slotted, as shown at 29 to form guides for the rear ends of the links 18 and 22 and the pins 21 and 24 are arranged transversely in said slot.

Changes in the form, proportion, and the minor details of construction may be resorted to without departing from the spirit of or sacrificing the advantages of my invention.

In the construction illustrated in the drawings, I have also shown a device for limiting the movement of the crank-arms 6 with relation to the hangers 2, to prevent the center of the cross-bar 5 from swinging forward beyond a vertical line passing through the center of the spindle, such device consisting of a stop, 31, provided with a stem, (not shown) which is fitted in a perforation 30, in the hanger 2. Various modifications of this construction may be employed to accomplish the same purpose.

When the scoop is in a lowered, operative position, and locked, and it becomes desirable to raise it, the bail or lever will be swung back or depressed for such purpose, as hereinbefore set forth, and during the initial portion of such movement on the part of the lever, the scoop will to some extent be raised in a locked condition, and hence when breaking ground, or when the draft is too heavy for the team, undue dumping of the scoop will be avoided. Thus, when said initial portion of the lever action takes place, it will by reason of the engagement of the locking-arms with the draft-bars tend to raise to some extent the forward end of the scoop, and obviously, as the locking arms leave the draft-arms, the scoop will continue to be held against dumping tilt until the locking arms are entirely free from and out of the way of the rear ends of said draft-bars.

What I claim as my invention is—

1. In a device of the class described, the combination with a cranked-axle of a shovel or scoop depending therefrom an operating lever, and links connecting the operating lever and arms of the axle and adapted to operate successively in communicating motion from the former to the latter, substantially as specified.

2. In a dumping wheeled-scraper, the combination of the scoop, a draft-arm and a raising and lowering lever-arm separately pivoted upon a side of the scoop, and successively operating power transmitting connections between the axle and the lever, substantially as described.

3. In a dumping wheeled-scraper, the combination of the scoop, a draft-arm pivotally attached to a side of the scoop, a raising and lowering arm pivotally attached to said side of the scoop at a point below and in rear of the draft-arm pivot, and successively operating power transmitting connections between the axle and the lever, substantially as described.

4. In a device of the class described, the combination with a cranked axle of a pendent shovel or scoop, a pivoted operating lever, and links 18 and 22 connecting the operating lever to the arms of the axle, substantially as specified.

5. In a device of the class described, the combination with a cranked-axle of a pendent shovel or scoop, an operating lever pivotally connected to the shovel or scoop, and slotted terminal and intermediate links connecting said lever and the arms of the axle at different distances from their fulcrums or pivotal points, substantially as specified.

6. In a device of the class described, the combination with a cranked axle, of a pendent shovel or scoop, an operating lever pivotally connected to the shovel or scoop, slotted terminal and intermediate links connecting said lever and the arms of the axle at different distances from their fulcrums or pivotal points, and eccentric connections between the shovel or scoop and the axle, the same consisting of eyes or bearings carried by the hangers of the shovel and eccentrics fixed to the axle and fitting in said eyes or bearings, substantially as specified.

7. In a dumping wheeled-scraper, the combination with the scoop, of a draft-arm pivotally attached thereto and having an extension in rear of its pivotal connection, and a lever for raising and lowering the scoop, pivoted upon a side of the same and provided with a locking device arranged to engage said rear extension of the draft-arm and lock the scoop in an operative position, substantially as described.

8. In a dumping wheeled-scraper, the combination with the scoop, of a draft-arm pivotally attached thereto and having an extension in rear of its pivotal connection, a raising and lowering lever-arm pivoted to the scoop in rear of the draft-arm pivot, and a locking device comprising an arm on the lever arranged to engage the end of said rear extension of the draft-arm and lock down the scoop in an operative position, substantially as described.

9. In a wheeled dumping-scraper, the bowl provided with a device arranged for locking it in an operative position and comprising the beveled head 13 and a vibratory arm 17, which engages the beveled face of said head when in position to lock down the scoop, substantially as described.

10. In a device of the class described, the combination with a cranked-axle, a shovel or scoop provided with hangers connected to said axle, a draft-iron pivotally connected to the sides of the shovel or scoop, a pivotal operating-lever, links connecting the operating lever to the arms of said axle, and a lock for the draft-iron comprising a locking arm fixed to the operating-lever and arranged at an acute angle to the plane thereof, and a beveled head or extension upon the draft-iron to be engaged by said locking-arm, when the shovel or scoop is in its depressed or operative position, substantially as specified.

11. In a device of the class described, a pendent shovel or scoop, a draft-iron pivotally connected thereto and provided in rear of its fulcrum with a beveled extension or head, a locking-arm pivotally connected to the side of the shovel or scoop in position to engage said beveled extension or head when the shovel or scoop is in its operative position, an operating lever connected to said operating arm, and slotted terminal and intermediate links connecting the lever to the supporting axle, whereby the shovel or scoop is capable of vertical movement to avoid obstructions without disengaging the locking-devices, substantially as specified.

PATRICK DEEVY.

Witnesses:
CHAS. G. PAGE,
RETA M. WAGNER.